Dec. 26, 1961 T. R. STOCKTON 3,014,567
OVERRUNNING COUPLING MECHANISM
Filed Dec. 13, 1957 2 Sheets-Sheet 1

INVENTOR:
Thomas R. Stockton
BY Edwin C. McRae
John A. Faulkner
and Donald J. Harrington
ATTORNEYS.

United States Patent Office 3,014,567
Patented Dec. 26, 1961

3,014,567
OVERRUNNING COUPLING MECHANISM
Thomas R. Stockton, Northville, Mich., assignor to Ford Motor Company, Dearborn, Mich., a corporation of Delaware
Filed Dec. 13, 1957, Ser. No. 702,556
4 Claims. (Cl. 192—45)

My invention relates generally to a new and improved clutch or brake mechanism and more particularly to an overrunning clutch or brake capable of inhibiting relative rotation between two concentric shafts in one direction while accommodating relative rotation in the opposite direction.

The principles of my invention are particularly adapted for use with roller type overrunning clutches and brakes and the improvement embodied in my inventive concept results in a substantial simplification in design and makes possible simplified manufacturing and assembly techniques.

According to a principal feature of my improved construction, concentric inner and outer races are provided and a plurality of circumferentially spaced rollers are situated between the races. One of the races is formed with cam surfaces and the individual rollers are each urged into camming engagement with an associated cam surface by compression springs, a separate spring acting against each roller. The springs are situated in slipper elements which in turn are anchored to the outer race, said slipper elements acting as reaction members for the compression springs.

The provision of an improved clutch or brake construction of the type above set forth being a principal object of my invention, it is a further object of my invention to provide a clutch or brake mechanism of simplified construction wherein a minimum of finish machining is required during manufacture and wherein an economical use of material is made possible.

It is a further object of my invention to provide a roller type clutch or brake construction wherein the number of rollers included therein is substantially greater than the number of rollers which can be used with conventional constructions of corresponding size.

It is a further object of my invention to provide a clutch or brake construction of the roller type wherein means are provided for maintaining the rollers in assembled relationship without the need for a complex roller supporting cage.

It is a further object of my invention to provide a roller type one-way clutch or brake with concentric inner and outer races wherein the roller elements are urged in a tangential direction by spring members and wherein slipper type spring retainers are anchored in the outer race, said retainers further functioning as a pilot means for the assembly.

For the purpose of more particularly describing the principal features of my instant invention reference will be made to the accompanying drawings wherein:

FIGURE 3 is an enlarged sectional view of a portion of the assembly shown in FIGURE 2.

Figure 1:
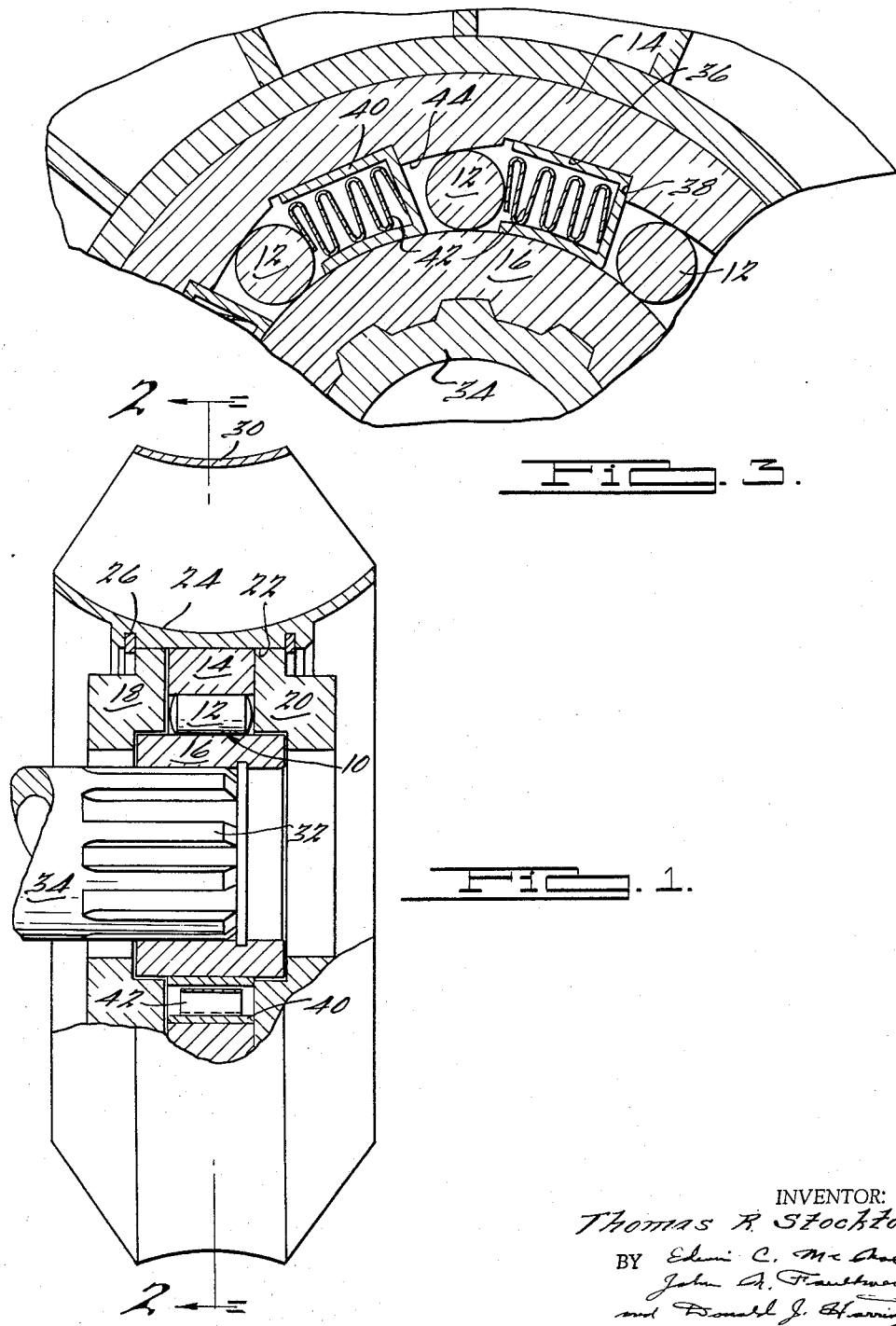
FIGURE 1 is a longitudinal cross sectional assembly view of a bladed torque converter reactor member wherein a roller type one-way brake of my instant invention is interposed between the bladed portion of the reactor assembly and a stationary sleeve shaft.

Referring first to FIGURE 1, the one-way clutch construction of my instant invention is generally designated by numeral 10 and it is comprised of a plurality of rollers 12 situated between an outer race 14 and an inner race 16. A pair of thrust members 18 and 20 are disposed on either axial side of the rollers 12 and the races 14 and 16 as indicated, and they are positioned within an internal opening 22 on the hub of the reactor shroud which is shown at 24. The thrust members 18 and 20 are circular in shape and are provided with an external diameter substantially equal to the internal diameter of opening 22 and they are held in axially spaced and fixed relationship by suitable snap rings 26 and 28.

The reactor includes another shroud 30 and a plurality of reactor blades are positioned between the shrouds 24 and 30 in circumferentially spaced relationship about the geometric axis of the reactor assembly. The inner race 16 of the brake construction may be internally splined and secured to the mating external splines 32 of a relatively stationary reactor sleeve shaft 34.

It is thus apparent that the bladed portion of the reactor assembly is capable of rotation in one direction about its geometric axis and is inhibited from rotating in the opposite direction thereby providing a reverse torque reaction as the circulating fluid traverses the torque converter circuit. The reactor assembly may be used in cooperation with hydrokinetic torque converter pump and turbine members in a conventional fashion.

Although the presently disclosed embodiment of my invention is directed to a one-way brake for use with a torque converter reactor, I contemplate that the construction of my instant invention may also be used as a clutch to form a one-way driving connection between two coaxially disposed shafts wherein one of the shafts is positively connected to the outer race of the clutch construction and the other shaft is positively connected to the inner race thereof.

Figure 2:
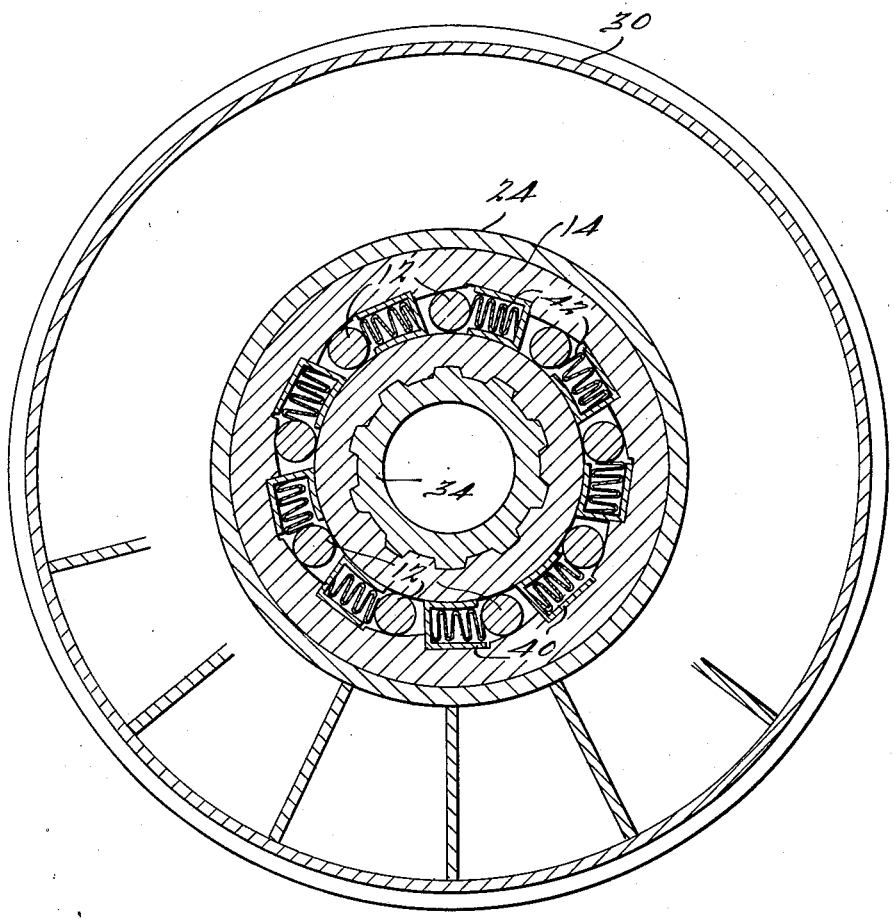
FIGURE 2 is a transverse cross sectional view of the reactor assembly of FIGURE 1 and is taken along section line 2—2 of FIGURE 1.

As best seen in FIGURES 2 and 3 the outer race 14 is formed with a plurality of recesses 36 having a flat surface situated in a generally tangential plane and a substantially radially directed abutment surface 38.

A plurality of slipper elements 40 are positioned in the recesses in the outer race 14, one slipper element being situated in each recess as shown. The slipper elements 40 are formed with a substantially U-shape with one leg thereof contacting the tangential surface of the recess 36 and with the base of the slipper element engaging the abutment surface 38. The radially inward leg of the slipper element 40 is preferably curved as indicated and it contacts the inner race 16 tangentially. The slipper elements 40 thus serve as a pilot means for accurately spacing the inner and outer races 16 and 14.

A compression spring 42 is situated in each of the slipper elements 40 and they are each formed with a convoluted shape with the innermost convolutions engaging the base of the associated slipper element. The free end of each of the convoluted compression springs 42 is adapted to contact one of the rollers 12, one roller being situated between each pair of slipper elements 40 as indicated.

A cam surface 44 is formed in the outer race 14 between each pair of recesses and the rollers 12 are urged into camming engagement therewith by associated compression springs 42. The springs 42 are flat leaf type springs of substantial width and axial displacement thereof is prevented by the above described thrust members 18 and 20.

The recesses in the outer race 14 may be formed by a simple broaching operation and a minimum amount of metal is required to be removed. The slipper elements 40 may be formed by a simple stamping and bending operation. This construction makes it possible to use a structure of a relatively thin gauge in comparison to roller type clutch or brake constructions of conventional design. Furthermore, the instant construction makes it possible to employ a larger number of rollers by reason of the fact that complex roller cages and reaction shoulders are entirely eliminated. Further, the number of critical dimensions is substantially reduced in comparison to constructions of conventional design.

Although I have disclosed a preferred embodiment of my invention, I contemplate that variations in the basic configuration and dimensions illustrated in the drawings can be made without departing from the scope of the invention as defined by the following claims.

I claim:

1. An overrunning coupling device comprising concentric circular inner and outer races, a plurality of rollers situated between said races, said outer race being formed with circumferentially spaced cam surfaces, recesses formed in said outer race and defining circumferentially spaced abutment shoulders, each of said cam surfaces being disposed between two adjacent recesses, separate slipper elements individually mounted in said recess in engagement with said shoulders, the maximum radial depth of said recesses being substantially less than the maximum radial dimension of said slipper elements, a spring means situated in each slipper element for individually urging each roller into camming engagement with a separate one of said cam surfaces, said slipper elements having three sides, one side of each slipper element being received in an associated recess in said outer race and another side thereof being situated in engagement with said inner race for piloting said inner race relative to said outer race.

2. The combination as set forth in claim 1 wherein said slipper elements are substantially U-shaped with one leg of each slipper element being received in an associated recess in said outer race and another leg thereof being situated in tangential engagement with said inner race for piloting the same, the spring means for each slipper element acting against the base of the slipper element to provide a tangentially directed reaction force.

3. An overrunning coupling device comprising concentric circular inner and outer races, a plurality of rollers situated between said races, said outer race being formed with circumferentially spaced cam surfaces, recesses formed in said outer race and defining circumferentially spaced abutment shoulders, each of said cam surfaces being disposed between two adjacent recesses, separate slipper elements individually mounted in said recess in engagement with said shoulders, the maximum radial depth of said recesses being substantially less than the maximum radial dimension of said slipper elements, a spring means situated in each slipper element for individually urging each roller into camming engagement with a separate one of said cam surfaces, said slipper elements having three sides, one side of each slipper element being received in an associated recess in said outer race and another side thereof being situated in engagement with said inner race for piloting said inner race relative to said outer race, each of said spring means comprising a convoluted flat spring element situated between the third side of each slipper element and an adjacent roller.

4. An overrunning coupling mechanism comprising concentric circular inner and outer races, a plurality of rollers situated between said races, said outer race being formed with circumferentially spaced cam surfaces, recesses formed in said outer race between said cam surfaces, said recesses being defined by a first surface situated in a plane parallel to a plane tangent to said inner race and by a transverse surface situated substantially at a right angle with respect to said first surface, a separate slipper element individually mounted in each recess, the maximum radial depth of said races being substantially less than the maximum radial dimension of said slipper elements, said slipper elements having a U-shape with three sides, one slipper element being situated in each recess with one side thereof engaging the first surface of the associated recess and another side thereof being situated in tangential engagement with the inner race for piloting said inner race relative to said outer race, the third side of each slipper being in abutting engagement with the second surface of the associated recess, and a spring means situated in each slipper element for individually urging each roller into camming engagement with a separate one of said cam surfaces.

References Cited in the file of this patent

UNITED STATES PATENTS

| 2,069,558 | Rauen et al. | Feb. 2, 1937 |
| 2,172,653 | Flogaus | Sept. 12, 1939 |
| 2,371,653 | Schuckers | Mar. 20, 1945 |

FOREIGN PATENTS

| 822,455 | Germany | July 8, 1949 |